UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

COMPOUNDING OF RUBBER.

1,245,700. Specification of Letters Patent. Patented Nov. 6, 1917.

No Drawing. Application filed May 26, 1916. Serial No. 100,153.

*To all whom it may concern:*

Be it known that I, WILLIAM C. GEER, a citizen of the United States, residing at Akron, in the county of Summit and State of Ohio, have invented certain new and useful Improvements in the Compounding of Rubber, of which the following is a specification.

This invention relates to the compounding of rubber in a mixing mill with ingredients such as gas-black which occur in the form of a powder so finely divided or impalpable that if used in a dry condition they tend to spread through the atmosphere of the mill room, causing the loss of a portion of the powder and discomfort to the operatives.

I find that by mixing the powder with a suitable liquid before it is introduced to the batch of rubber on the rolls of the mill, and bringing the powder to a granular condition through the wetting of the particles and their concretion into grains, the objection stated is entirely overcome.

Two liquids which I have successfully employed for this purpose are water and kerosene oil, both of which have the effect of rendering the gas-black dustless and yet not pasty when mixed therewith in suitable proportions. For example, I mix two parts, by weight, of gas-black with one part of kerosene oil in a suitable closed vessel which preferably contains rapidly-revolving paddles which assist the mixing and promote the attainment of the granular condition. The oil coats and concretes the particles as stated and brings the mass into a condition suitable for its proper distribution throughout the rubber on the heated rolls of the mixing mill. The volatility of the oil is such that a portion of it evaporates from the batch on the rolls and substantially all of the residue evaporates from the finished vulcanized articles made from the rubber batch within a few days after the article is cured, this being shown by the gradual increase in tensile strength of the vulcanized rubber until within a few days its strength becomes normal. Pneumatic tire treads compounded in this way show no difference in wear from those compounded with dry gas-black.

The use of water gives an effect substantially the same as kerosene, but it requires a longer time for compounding on the mill in order to permit the drying-out of the water.

I claim:

1. The method of compounding a fine powder with rubber on a mixing mill which consists in wetting the powder and then introducing it to the batch of rubber on the mill.

2. The process of compounding rubber with an impalpable powder which consists in rendering the powder granular and substantially dustless with a liquid and then compounding it with the rubber.

3. The method of compounding a plastic such as rubber with an impalpable powder such as gas-black which consists in wetting the powder with a volatile liquid which is subsequently evaporated, to render the same substantially dustless, and incorporating said substantially dustless powder with the rubber.

4. The method of compounding rubber with gas-black which consists in wetting the gas-black with a volatile liquid which is subsequently evaporated, and incorporating the same with the rubber on a mixing mill.

5. The process of compounding rubber with an impalpable powder which consists in bringing the powder with oil to a dustless granular condition and then compounding it with the rubber.

6. The process of compounding rubber with an impalpable powder which consists in bringing the powder with kerosene oil to a dustless granular condition and then mixing it with the rubber.

7. The process of compounding rubber with gas-black on a mixing mill which consists in bringing the gas-black with kerosene oil to a dustless granular condition and then compounding it with the rubber.

In testimony whereof I have hereunto set my hand this 16th day of May, 1916.

WILLIAM C. GEER.